(12) United States Patent
John et al.

(10) Patent No.: US 10,563,609 B2
(45) Date of Patent: Feb. 18, 2020

(54) FUEL INJECTOR

(71) Applicant: Caterpillar Inc., Peoria, IL (US)

(72) Inventors: Bobby John, Peoria, IL (US); Glen Clifford Martin, Peoria, IL (US); Jonathan W. Anders, Peoria, IL (US); Robert M. Campion, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/814,958

(22) Filed: Nov. 16, 2017

(65) Prior Publication Data

US 2019/0145340 A1    May 16, 2019

(51) Int. Cl.
| | |
|---|---|
| *F02D 41/30* | (2006.01) |
| *F02M 45/08* | (2006.01) |
| *F02M 61/18* | (2006.01) |
| *F02M 43/04* | (2006.01) |
| *F02D 41/40* | (2006.01) |
| *F02D 19/06* | (2006.01) |
| *F02M 61/12* | (2006.01) |
| *F02D 41/00* | (2006.01) |

(52) U.S. Cl.
CPC ..... *F02D 41/3094* (2013.01); *F02D 19/0694* (2013.01); *F02D 41/40* (2013.01); *F02M 43/04* (2013.01); *F02M 45/086* (2013.01); *F02M 61/1806* (2013.01); *F02D 41/0025* (2013.01); *F02M 61/12* (2013.01); *F02M 2200/46* (2013.01)

(58) Field of Classification Search
CPC .... F02D 41/3094; F02M 43/04; F02M 61/12; F02M 45/086; F02M 61/1806; F02M 2200/46
See application file for complete search history.

(56) References Cited

U.S. PATENT DOCUMENTS

| | | | |
|---|---|---|---|
| 5,421,521 A * | 6/1995 | Gibson | F02M 51/0621 239/585.4 |
| 5,671,717 A * | 9/1997 | Rembold | F02M 25/03 123/25 C |
| 5,899,385 A | 5/1999 | Hofmann et al. | |
| 6,024,297 A | 2/2000 | Greeves | |
| 6,439,192 B1 | 8/2002 | Ouellette et al. | |
| 6,467,702 B1 | 10/2002 | Lambert et al. | |
| 9,255,557 B2 | 2/2016 | Park et al. | |
| 9,506,434 B2 | 11/2016 | Coldren | |
| 9,664,122 B2 | 5/2017 | Coldren et al. | |

(Continued)

FOREIGN PATENT DOCUMENTS

| | | |
|---|---|---|
| DE | 10319980 | 8/2004 |
| DE | 102004021538 | 12/2005 |
| EP | 3159531 | 4/2017 |

*Primary Examiner* — Joseph J Dallo
(74) *Attorney, Agent, or Firm* — Harrity & Harrity LLP

(57) ABSTRACT

A fuel injector includes a nozzle having at least one first orifice. The at least one first orifice selectively injects a first fuel. An outer check is located movably within the nozzle. The outer check includes at least one second orifice. The at least one second orifice selectively injects a second fuel. An inner check is located movably and concentrically within the outer check. The at least one first orifice is adapted to selectively inject at least one of the first fuel and the second fuel therethrough based on a position of each of the outer check and the inner check.

20 Claims, 8 Drawing Sheets

(56) References Cited

U.S. PATENT DOCUMENTS

| | | | | |
|---|---|---|---|---|
| 2003/0010320 A1* | 1/2003 | Gillis | F02M 43/00 | 123/468 |
| 2011/0108631 A1 | 5/2011 | Mumford et al. | | |
| 2013/0160741 A1* | 6/2013 | Sommars | F02M 43/04 | 123/456 |
| 2013/0160742 A1* | 6/2013 | Brown | F02M 63/029 | 123/456 |
| 2013/0319373 A1* | 12/2013 | Brown | F02M 43/04 | 123/456 |
| 2014/0034019 A1* | 2/2014 | Mittal | F02D 19/06 | 123/456 |
| 2014/0034023 A1* | 2/2014 | Coldren | F02D 19/0694 | 123/472 |
| 2014/0061326 A1* | 3/2014 | Coldren | F02M 45/086 | 239/5 |
| 2014/0069387 A1* | 3/2014 | Brown | F02M 45/086 | 123/456 |
| 2014/0091159 A1* | 4/2014 | Brown | F02M 63/00 | 239/398 |
| 2014/0123936 A1* | 5/2014 | Kim | F02M 43/04 | 123/299 |
| 2014/0123948 A1* | 5/2014 | Mittal | F02M 45/086 | 123/456 |
| 2014/0182552 A1* | 7/2014 | Brown | F02D 19/10 | 123/456 |
| 2014/0188372 A1* | 7/2014 | Puckett | F02M 21/0281 | 701/104 |
| 2014/0311451 A1* | 10/2014 | Fang | F02M 21/0284 | 123/445 |
| 2014/0311455 A1* | 10/2014 | Kim | F02M 43/04 | 123/472 |
| 2014/0331962 A1* | 11/2014 | Stockner | F02D 19/0623 | 123/304 |
| 2015/0047614 A1* | 2/2015 | Kim | F02M 43/04 | 123/470 |
| 2015/0247468 A1* | 9/2015 | Chittenden | F02D 19/0694 | 123/490 |
| 2016/0069312 A1* | 3/2016 | Brown | H01F 7/1638 | 239/585.5 |
| 2016/0305382 A1* | 10/2016 | Kim | F02M 61/12 | |

* cited by examiner

FUEL INJECTOR

TECHNICAL FIELD

The present disclosure relates to a fuel injector. More specifically, the present disclosure relates to a fuel injector for an internal combustion engine.

BACKGROUND

An internal combustion engine generally combusts a fuel to produce mechanical power. Introduction of the fuel into a cylinder of the internal combustion engine is most commonly achieved using a fuel injector. A commonly used injector is a closed-nozzle injector which includes a nozzle assembly having a spring-biased needle valve element positioned adjacent an injector nozzle for allowing the fuel to be injected into the cylinder of the internal combustion engine. The needle valve element moves to allow the fuel to pass through the injector nozzle and out of injector orifices or spray holes, thus marking the beginning of a fuel injection event.

Dual fuel engines typically may have an injector with two nozzles placed adjacent to each other where a pilot injection of a diesel fuel and injection of a gaseous or liquid fuel may occur through the separate nozzles. The diesel fuel is primarily responsible for starting the ignition. However, when the two nozzles are adjacent to each other, it may be possible that some amount of the gaseous fuel may not come in contact with the diesel fuel, and subsequently leads to poor combustion characteristics which, in turn, may lead to higher emission levels.

German Patent Application Number DE 10200/4021538 describes a fluid flow control valve. The fluid flow control valve includes two coaxial valve needles. An inner needle is completely enclosed, inside an outer needle. Flow of fuel to jets in the outer needle is blocked by the inner needle. Large diameter jets in the hollow conical nozzle body are provided in line with the jets in the outer needle. The outer needle blocks additional flow to jets in a conical nozzle. The inner and the outer needles together provide a set of injection openings to inject fuel into the combustion chamber.

SUMMARY

In an aspect of the present disclosure, a fuel injector is provided. The fuel injector includes a nozzle including at least one first orifice. The at least one first orifice selectively injects a first fuel. The fuel injector includes an outer check disposed movably within the nozzle. The outer check includes at least one second orifice. The at least one second orifice selectively injects a second fuel. The fuel injector further includes an inner check disposed movably and concentrically within the outer check. The at least one first orifice is adapted to selectively inject at least one of the first fuel and the second fuel therethrough based on a position of each of the outer check and the inner check.

In another aspect of the present disclosure, a fuel injection system is provided. The fuel injection system includes a first fuel source adapted to provide a first fuel. The fuel injection system includes a second fuel source adapted to provide a second fuel. The fuel injection system includes a fuel injector provided in fluid communication with each of the first fuel source and the second fuel source. The fuel injector includes a nozzle having at least one first orifice. The at least one first orifice selectively injects the first fuel. The fuel injector includes an outer check disposed movably within the nozzle. The outer check includes at least one second orifice. The at least one second orifice selectively injects the second fuel. The fuel injector further includes an inner check disposed movably and concentrically within the outer check. The fuel injection system further includes a controller communicably coupled to each of the first fuel source, the second fuel source, and the fuel injector.

In yet another aspect of the present disclosure, a method for controlling a fuel injector is provided. The fuel injector has a nozzle, an outer check, and an inner check. The method includes providing flow of a first fuel to the fuel injector. The method includes providing flow of a second fuel to the fuel injector. The method includes controlling a position of the outer check. The method includes selectively injecting the first fuel through at least one first orifice. The method includes controlling a position of the inner check. The method includes selectively injecting the second fuel through at least one second orifice. The method further includes selectively injecting at least one of the first fuel and the second fuel through the at least one first orifice.

DETAILED DESCRIPTION

Figure 1:
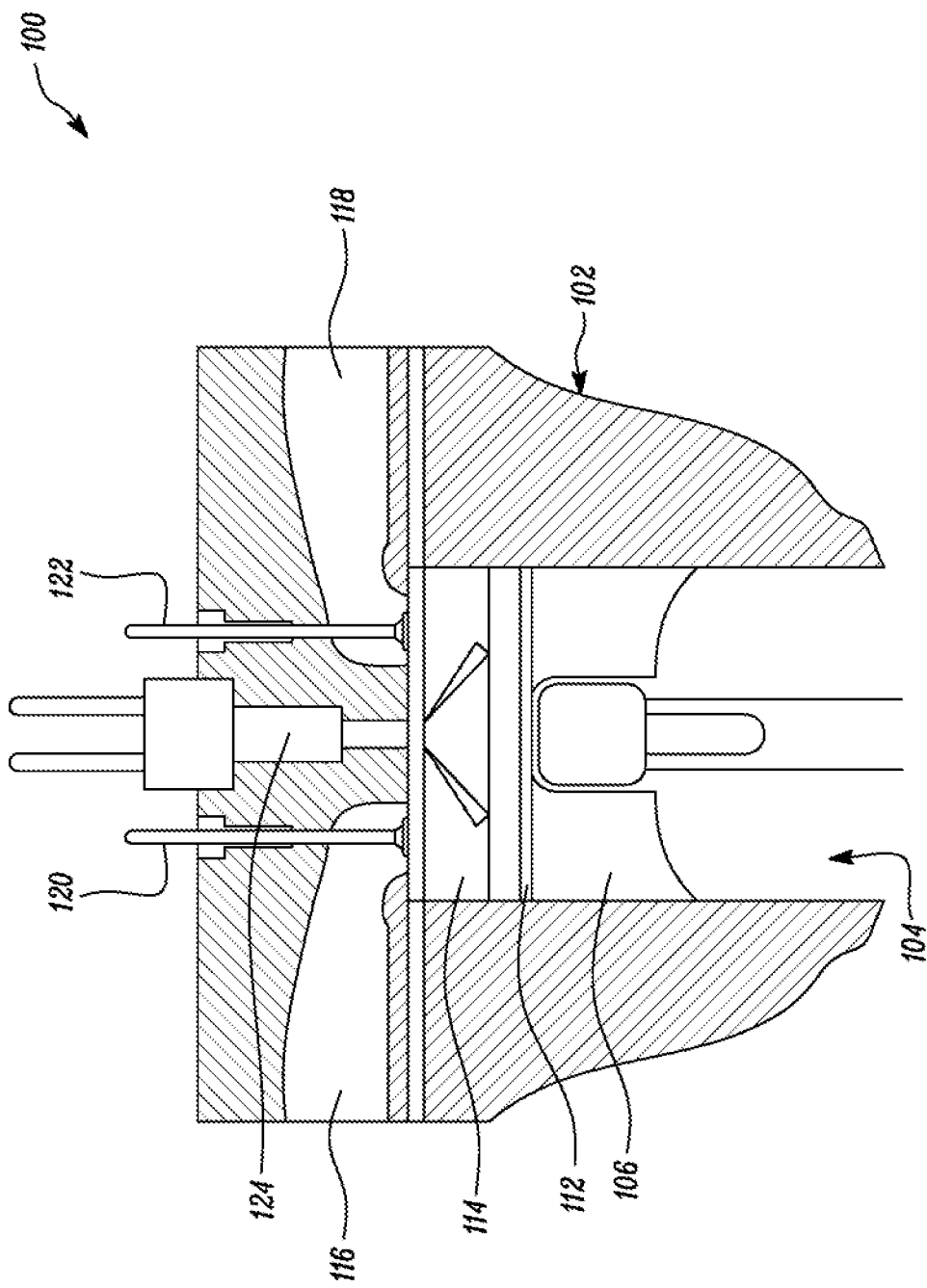
FIG. 1 illustrates an exemplary engine, in accordance with an embodiment of the present disclosure.

Wherever possible, the same reference numbers will be used throughout the drawings to refer to same or like parts. FIG. 1 illustrates an exemplary engine 100. The engine 100 is an internal combustion engine powered by any fuel known in the art, such as natural gas, diesel, or gasoline. In some embodiments, the engine 100 may be associated with a machine (not shown) including, but not limited to, a locomotive, a marine vessel, a land vehicle, and a power generator. The engine 100 and/or the machine may be employed in any industry including, but not limited to, construction, agriculture, forestry, mining, transportation, waste management, aviation, marine, material handling, and power generation.

The engine 100 includes an engine block 102. The engine block 102 defines a cylinder 104 within the engine block 102. It should be contemplated that only one cylinder 104 is illustrated for sake of clarity, and explanation. There may be any number of cylinders 104 provided with the engine 100 based on operational requirements of the engine 100. The cylinder 104 includes a piston 106 adapted to translate within the cylinder 104 between a top dead center and a bottom dead center. The piston 106 is provided with a piston ring 112 to limit leakage of any gases between the piston 106 and the cylinder 104. The cylinder 104 and the piston 106 together define a combustion chamber 114 for combusting a mixture of a fuel and an oxidant therein.

The combustion chamber 114 is coupled to each of an intake manifold 116 and an exhaust manifold 118 through an inlet valve 120 and an outlet valve 122 respectively. The inlet valve 120 allows inlet of the oxidant through the intake manifold 116 inside the combustion chamber 114. The oxidant is compressed inside the combustion chamber 114. The combustion chamber 114 is then provided with at least one of a first fuel or a second fuel through a fuel injector 124. Accordingly, the exhaust manifold 118 is adapted to receive an exhaust flow from the cylinders through the outlet valve 122. Additionally, the engine 100 may include various other components and/or systems (not shown) including, but not limited to, a crankcase, a fuel system, an air system, a cooling system, a lubrication system, a turbocharger, an exhaust gas recirculation system, and peripheries, among others.

Figure 2:
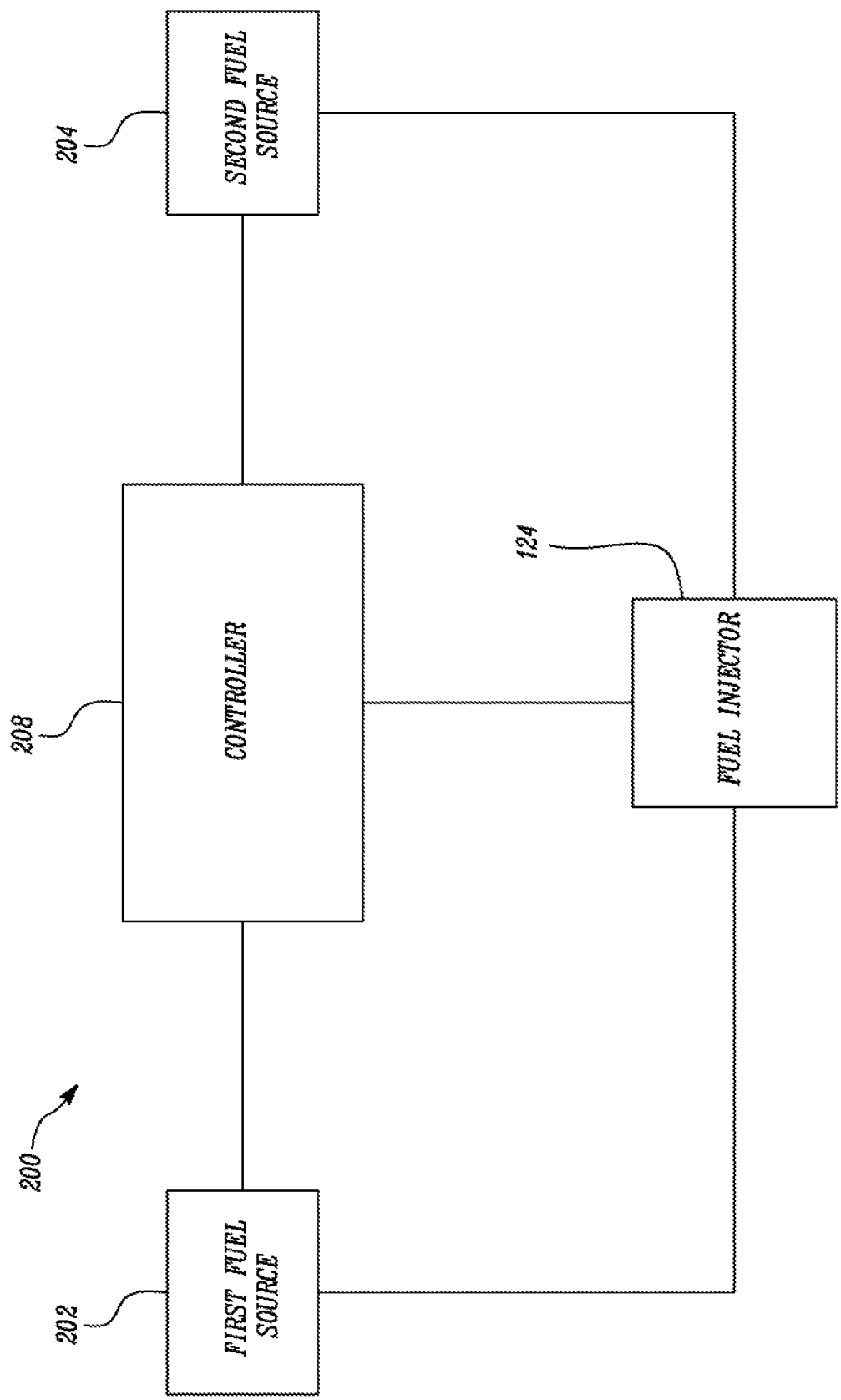
FIG. 2 schematically illustrates a fuel injection system for the engine of FIG. 1, in accordance with an embodiment of the present disclosure.

FIG. 2 shows a block diagram representing a fuel injection system 200 for the engine 100. The fuel injection system 200 includes a first fuel source 202. In one embodiment, the first fuel source 202 may be a source of a gaseous fuel such as natural gas, alcohol and so on. In another embodiment, the first fuel source 202 may be a source of a liquid fuel such as gasoline, diesel and so on. The first fuel source 202 is configured to store the first fuel, and supply the first fuel to the engine 100 as per operational requirements of the engine 100. The first fuel source 202 may be a fuel tank, a reservoir etc., which may store the first fuel, and may include associated parts and components required to supply the first fuel to the engine 100.

The fuel injection system 200 includes a second fuel source 204. In one embodiment, the second fuel source 204 may be a source of a liquid fuel such as diesel, gasoline, and so on. In another embodiment, the second fuel source 202 may be a source of gaseous fuel such as natural gas, alcohol and so on. The second fuel source 204 is configured to store the second fuel, and supply the second fuel to the engine 100 as per operational requirements of the engine 100. The second fuel source 204 may be a storage tank, or a reservoir etc., which may store the second fuel, and may include associated parts and components required to supply the second fuel to the engine 100.

The fuel injection system 200 includes a controller 208. The controller 208 may be a single controller, or a group of multiple controllers configured to control various aspects of operation of the engine 100. The controller 208 may be a microprocessor, a field programmable gate array (FPGA), or any other such component which may perform functions intended of a controller. The controller 208 is communicably coupled to the first fuel source 202 and the second fuel source 204. The controller 208 may control supply of the first fuel and the second fuel from the first fuel source 202 and the second fuel source 204 respectively, so as to provide an appropriate blend of the first fuel and the second fuel to be supplied to the engine 100.

The fuel injection system 200 further includes the fuel injector 124 to inject the first fuel and the second fuel into the cylinder 104. The fuel injector 124 is communicably coupled with the controller 208 such that the controller 208 may control operation of the fuel injector 124. The fuel injector 124 is also coupled with the first fuel source 202 and the second fuel source 204 such that the first fuel source 202 and the second fuel source 204 supply the first fuel and the second fuel respectively to the fuel injector 124. The controller 208 may control supply of the first fuel and the second fuel from the first fuel source 202 and the second fuel source 204 respectively to the fuel injector 124 as required.

Figure 3:
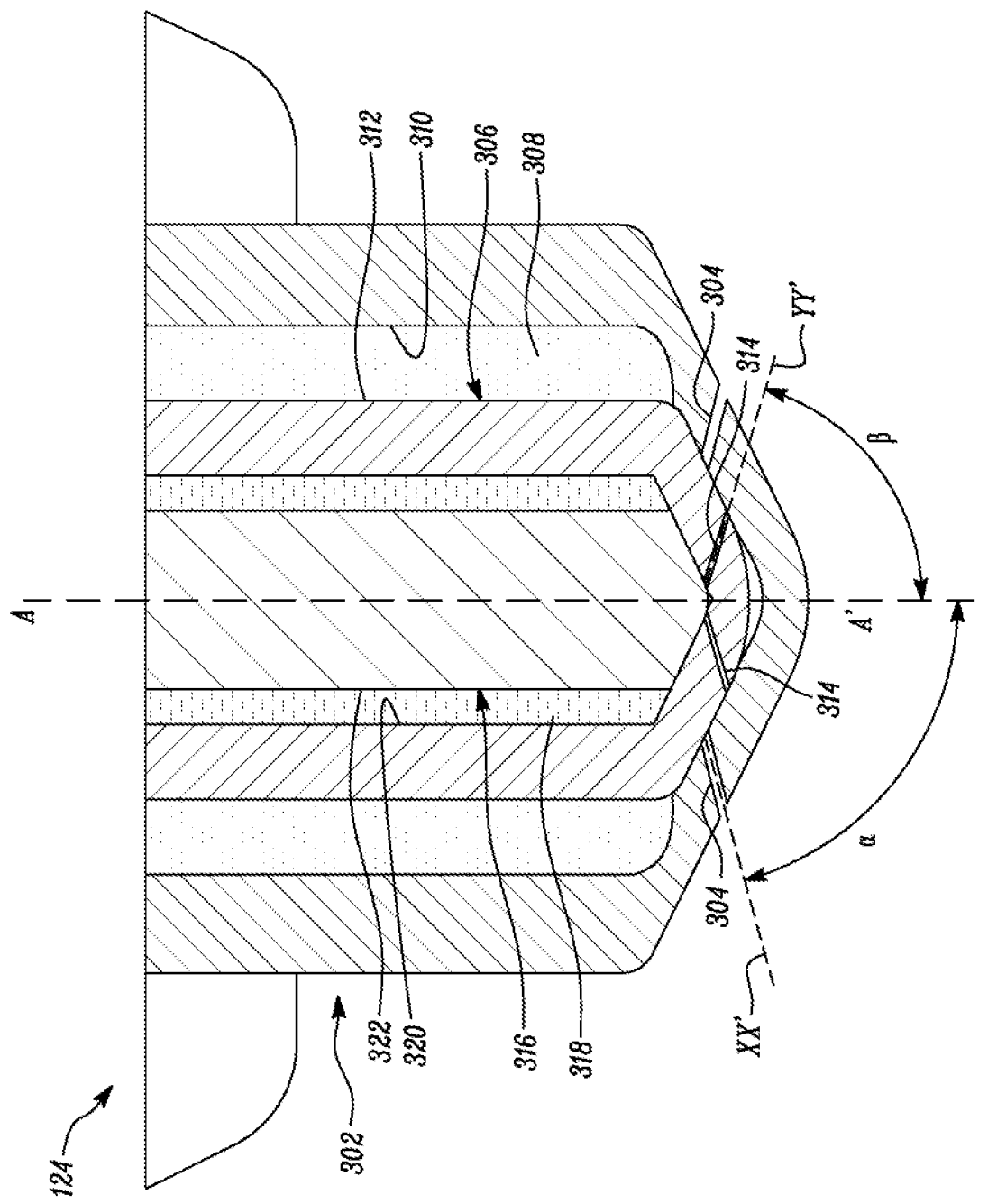
FIG. 3 illustrates a partial sectional view of an injector showing an outer check and an inner check in closed positions, in accordance with an embodiment of the present disclosure.

FIG. 3 shows a partial sectional view of the fuel injector 124. The fuel injector 124 includes a nozzle 302. The nozzle 302 has a substantially cylindrical structure, which tapers towards an end to form a substantially conical structure. The nozzle 302 defines at least one first orifice 304 within the conical structure. In the illustrated embodiment, the nozzle 302 includes two first orifices 304. It should be contemplated that the nozzle 302 may include any number of first orifices 304 as per application requirements.

The first orifice 304 may be an opening, or a hole defined within the nozzle 302 to allow flow of the first fuel through the nozzle 302 along a first spray axis X-X'. A central axis A-A' passes symmetrically through the fuel injector 124. The first orifices 304 are defined by the nozzle 302 symmetrically about the axis A-A'. The first orifices 304 define a first included angle "α" with respect to the axis A-A'. The first included angle "α" may also be defined as an angle included between the first spray axis X-X' and the central axis A-A', The first included angle "α" is same fur both the first orifices 304. In some embodiments, when there may be more than two first orifices 304, all the first orifices 304 may be provided at similar respective included angles.

Figure 4:
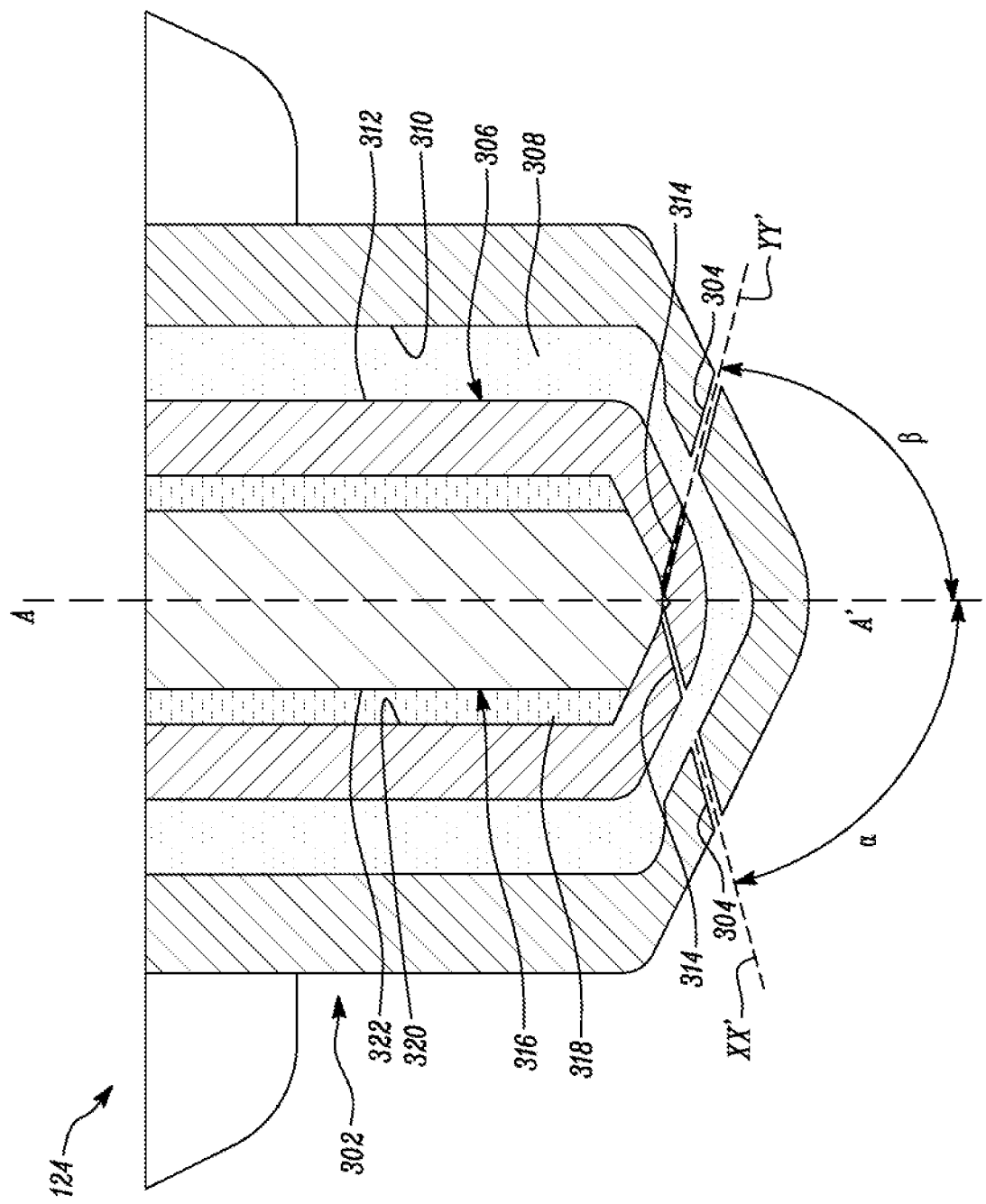
FIG. 4 illustrates a partial sectional view of the injector showing the outer check in open position and the inner check in closed position, in accordance with an embodiment of the present disclosure.
Figure 5:
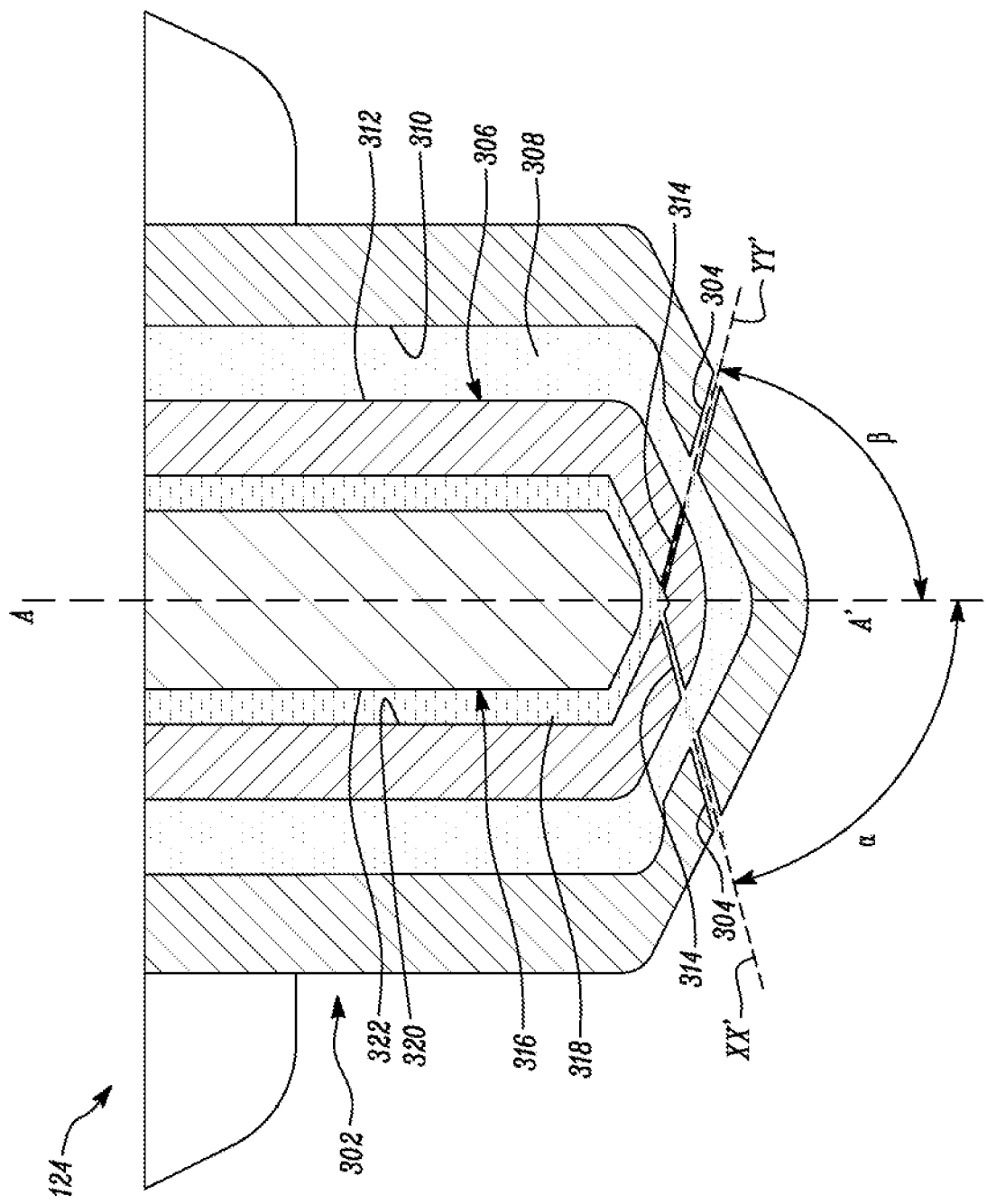
FIG. 5 illustrates a partial sectional view of the injector showing the outer check in open position and the inner check in open position, in accordance with an embodiment of the present disclosure.

The nozzle 302 has a hollow structure. The fuel injector 124 includes an outer check 306 disposed movably within the nozzle 302 along the axis A-A'. The outer check 306 is provided within the nozzle 302 such that the outer check 306 may translate along the axis A-A'. The outer check 306 may move between a closed position (as illustrated in FIG. 3) and an open position (as illustrated in FIGS. 4 and 5).

The controller 208 may be operatively coupled with the fuel injector 124 such that the controller 208 may control the movement of the outer check 306 within the nozzle 302 between the open position and the closed position. The outer check 306 and the nozzle 302 define a first passage 308 disposed concentrically between the outer check 306 and the nozzle 302. The first passage 308 may be coupled to the first fuel source 202, and the first fuel may be supplied through the first passage 308. More specifically, the first passage 308 is defined between an inner surface 310 of the nozzle 302, and an outer surface 312 of the outer check 306.

The outer check 306 has a substantially cylindrical structure, which tapers towards an end to form a substantially conical structure. The outer check 306 defines at least one second orifice 314 within the conical structure. In the illustrated embodiment, the outer check 306 includes two second orifices 314 along a second spray axis Y-Y'. It should be contemplated that the outer check 306 may include any number of second orifices 314 as per application requirements. The second orifice 314 is an opening, or a hole defined by the outer check 306 to allow flow of a fluid through the outer check 306. The second orifices 314 are defined by the outer check 306 symmetrically about the axis A-A'.

The second orifices 314 define a second included angle "β" with respect to the axis A-A'. The second included angle "β" may also be defined as an angle included between the second spray axis Y-Y' and the central axis A-A'. The second included angle "β" is same for both the second orifices 314. In some embodiments, when there may be more than two second orifices 314, all the second orifices 314 may be provided at similar respective included angles. The second included angle "β" may be similar to, or different than the first included angle "α". The present disclosure is not limited by values of the first included angle α and the second included angle β in any manner. Further, the fuel injector 124 is designed in a manner such that a cross-sectional area of the first orifice 304 is either equal to, or greater than a cross-sectional area of the second orifice 314.

The outer check 306 has a hollow structure. The fuel injector 124 further includes an inner check 316 provided within the outer check 306. The inner check 316 is disposed within the outer check 306, and is concentric with respect to the outer check 306 about the axis A-A'. The inner check 316 has a substantially cylindrical structure, which tapers towards an end to form a substantially conical structure. The inner check 316 is provided within the outer check 306 such that the inner check 316 may translate along the axis A-A'. The inner check. 316 may move between a closed position (as illustrated in FIGS. 3 and 4) and an open position (as illustrated in FIG. 5).

The controller 208 may be operatively coupled with the fuel injector 124 such that the controller 208 may control the movement of the inner check 316 within the outer check 306 between the open position and the closed position. The controller 208 may control the movement of the outer check 306 and the inner check 316 independently of each other. Also, the movement of the outer check 306 and the inner check 316 may be independent of each other. The inner check 316 and the outer check 306 define a second passage 318 disposed concentrically between the inner check 316 and the outer check 306. The second passage 318 may he coupled to the second fuel source 204, and the second fuel may be supplied through the second passage 318. More specifically, the second passage 318 is defined between an inner surface 320 of the outer check. 306, and an outer surface 322 of the inner check 316.

FIG. 4 shows the partial sectional view of the fuel injector 124 with the outer check 306 in the open position and the inner check 316 in the closed position. The outer check 306 allows flow of the first fuel through the first orifices 304 in the open position. The first fuel supplied by the first fuel source 202 flows through the first passage 308, and subsequently flows outside of the nozzle 302 through the first orifices 304. As the inner check 316 is in closed position, the second orifices 314 limit passage of the second fuel outside of the outer check 306.

FIG. 5 shows the partial sectional view of the fuel injector 124 with both the outer check 306 and the inner check 316 in open positions. The inner check 316 allows flow of the second fuel outside of the outer check 306 through the second orifices 314 in the open position. The second fuel flows through the second passage 318, and flows outside the outer check 306 through the second orifices 314.

Figure 6:
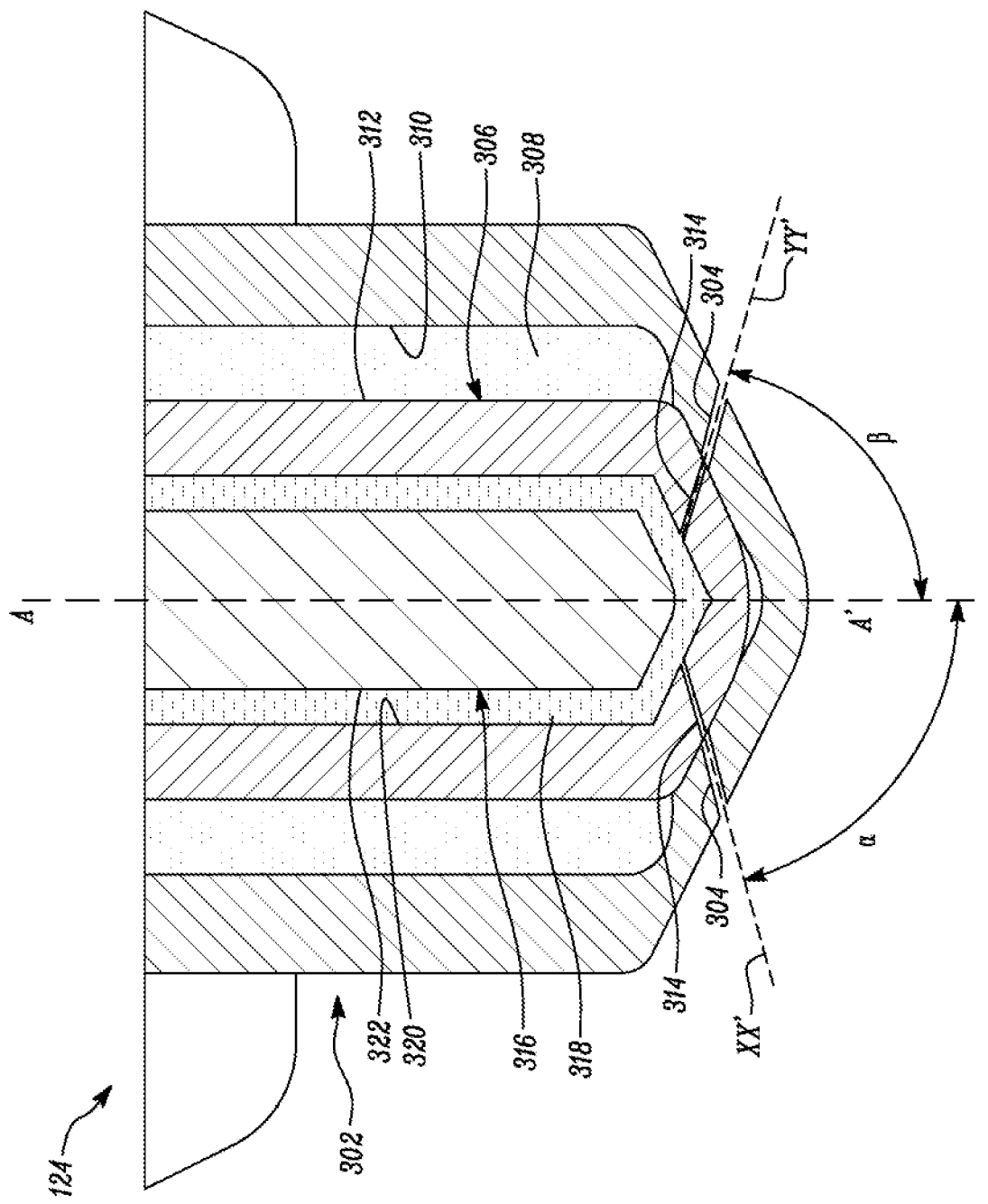
FIG. 6 illustrates a partial sectional view of the injector, in accordance with another embodiment of the present disclosure.
Figure 7:
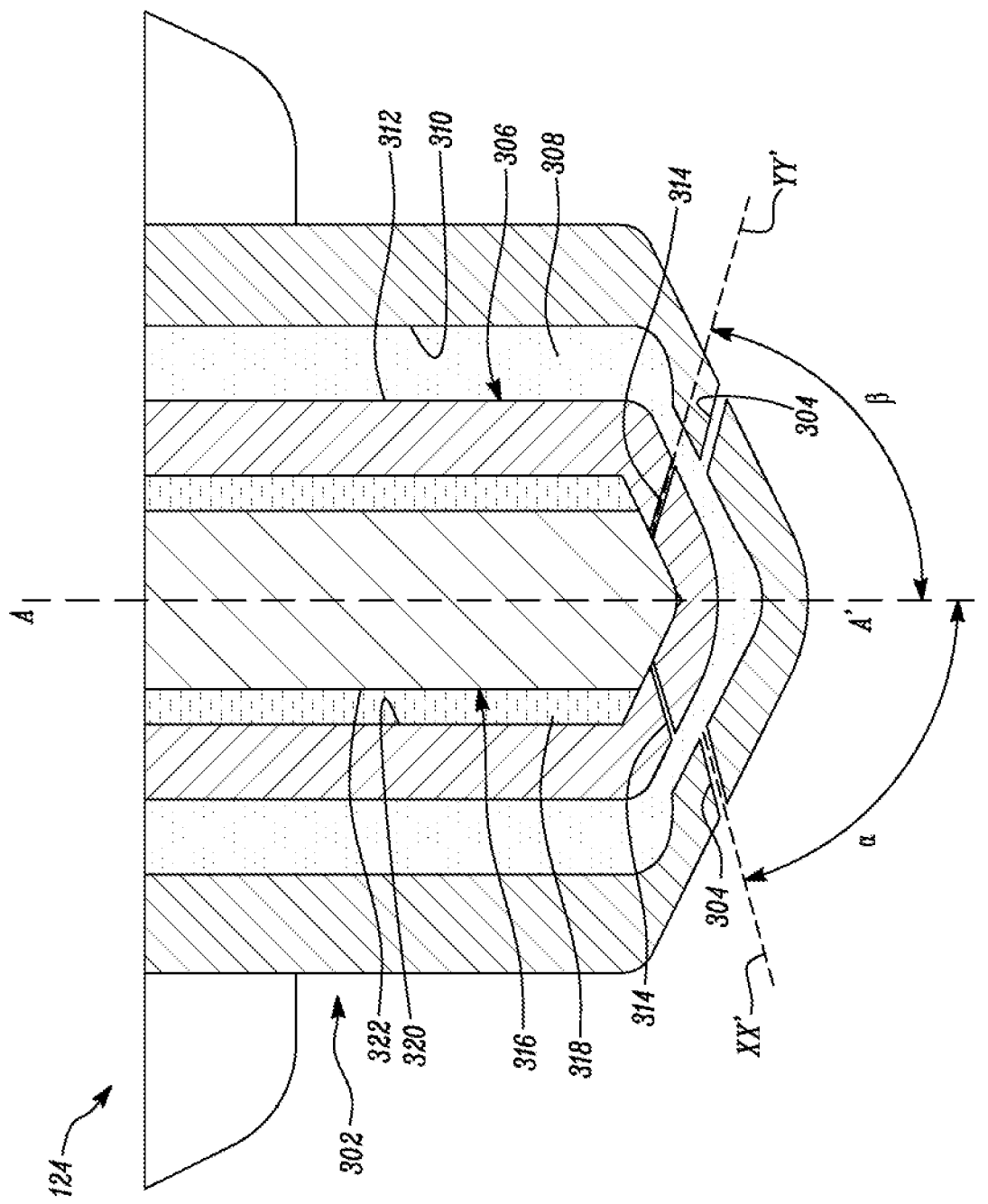
FIG. 7 illustrates a partial sectional view of the injector of FIG. 6, in accordance with another embodiment of the present disclosure.

FIGS. 6 and 7 illustrate another embodiment of the present disclosure facilitating sequential injection of the first fuel and the second fuel. FIG. 6 shows the fuel injector 124 with the outer check 306 in the closed position, and the inner check 316 in the open position. The controller 208 may control the position of the outer check 306 and the inner check 316 to position the outer check 306 and the inner check 316 as illustrated. In this embodiment, the structure of the outer check 306 is slightly modified as compared to the embodiments described in FIGS. 3-5. The second orifices 314 are provided within the outer check 306 such that when the outer check is in the closed position, the second orifices 314 align with the first orifices 304. The second fuel flows through the second passage 308, then through the second orifices 314, and subsequently through the first orifices 304 and gets injected in the cylinder 104.

Afterwards, the controller 208 controls the position of the outer check 306 and the inner check 316 so that the outer check 306 is in the open position and the inner check 316 is in the closed position as illustrated in FIG. 7. The first fuel flows through the first passage 308, and then flows through the first orifices 304 and gets injected in the cylinder 104. This embodiment allows the first fuel and the second fuel to be injected sequentially in the cylinder 104.

It should be contemplated that although the FIGS. 6 and 7 illustrate the sequential injection in a manner that the second fuel is injected before the first fuel is injected by controlling the position of the first check 306 and the second check 316, the present disclosure is not limited by an order of injection of the first fuel and the second fuel. It should be contemplated that the positions of the first check 306 and the second check 316 may also be controlled such that the first fuel may be injected before the injection of the second fuel, and the injection cycle may continue.

INDUSTRIAL APPLICABILITY

Figure 8:
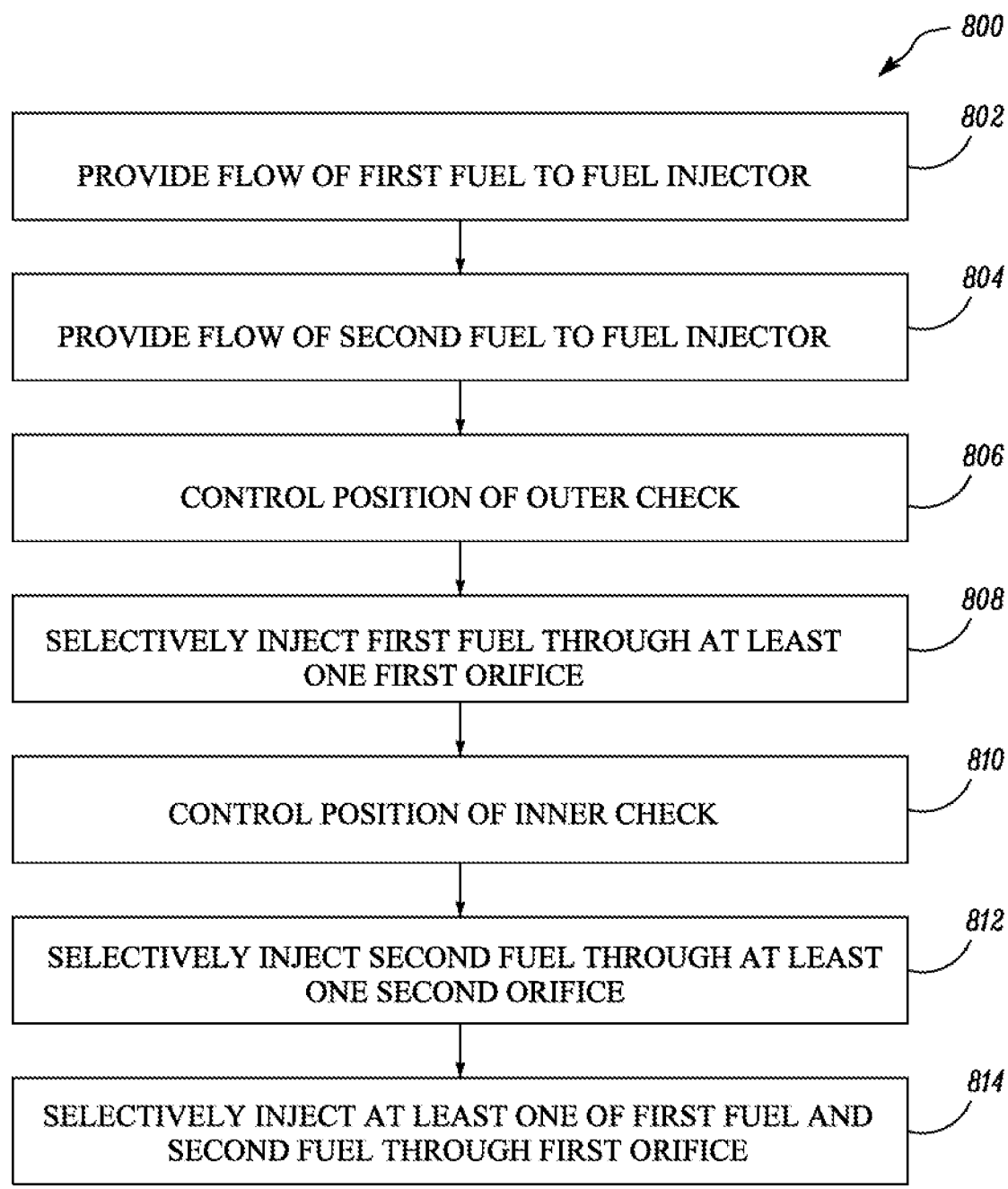
FIG. 8 illustrates a flow chart of a method for controlling the fuel injector, in accordance with an embodiment of the present disclosure.

The present disclosure provides a method 800 of controlling the fuel injector 124. Various steps of the method 800 are explained with help of a flow chart shown in FIG. 8. At step 802, the fuel injector 124 is provided with the first fuel through the first fuel source 202. The controller 208 may control supply of the first fuel to the fuel injector 124 through the first fuel source 202. At step 804, the fuel injector 124 is provided with the second fuel. The controller 208 may control supply of the second fuel to the fuel injector 124 through the second fuel source 204.

At step 806, position of the outer check 306 is controlled with respect to the nozzle 302 and/or the inner check 316. The controller 208 may control the movement of the outer check 306 inside the nozzle 302 between the open position and the closed position. The position of the outer check 306 is controlled by aligning the first orifice 304 with respect to the second orifice 314. At step 808, the first fuel is injected through the first orifice 304. At step 810, position of the inner check 316 is controlled with respect to the outer check 306. The controller 208 may control the position of the inner check 316 inside the outer check 306.

At step 812, the second fuel is injected through the second orifice 314. The controller 208 control supply of the second fuel to the fuel injector 124 through the second fuel source 206. At step 814, the first fuel and/or the second fuel may be sequentially or simultaneously injected through the first orifice 304. More specifically, as shown in FIG. 5, when the first orifice 304 may be aligned with respect to the second orifice 314, both the first fuel and the second fuel may be injected together into the cylinder 104. Also, as shown in FIGS. 6 and 7, based on an alignment of the first orifice 304 with respect to the second orifice 314, the first fuel or the second fuel may be injected sequentially. An amount of the first fuel and the second fuel may be controlled by controlling duration of injection through the controller 208. Further, based on the position of the outer check 306 with respect to the inner check 316 within the nozzle 302, the injection of the first fuel and/or the second fuel through first orifice 304 may be limited.

The fuel injector 124 provided by the present disclosure provides an improved means of injecting the first fuel and the second fuel in the combustion chamber 114. As the stream of the second fuel passes through the stream of the first fuel, contact area between the second fuel and the first fuel increases. Further, the second fuel stream symmetrically passes through the first fuel, thereby improving combustion characteristics, and subsequently producing lower emissions.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fuel injector comprising:
a nozzle including at least one first orifice provided therein,
the at least one first orifice adapted to selectively inject a first fuel therethrough;
an outer check disposed movably within the nozzle,
the outer check including at least one second orifice provided therein,
the at least one second orifice being disposed within the nozzle, and
the at least one second orifice adapted to selectively inject a second fuel therethrough; and
an inner check disposed movably and concentrically within the outer check;
a first passage, for the first fuel, provided between the nozzle and the outer check;
a second passage, for the second fuel, provided between the outer check and the inner check,
wherein the inner check is movable relative to the outer check,
wherein the outer check is movable relative to the nozzle, and
wherein the at least one first orifice is adapted to selectively inject both the first fuel and the second fuel through the at least one orifice based on a position of the outer check, relative to the nozzle, and a position of the inner check relative to the outer check.

2. The fuel injector of claim 1, wherein the at least one second orifice is adapted to align with respect to the at least one first orifice to selectively inject the first fuel and the second fuel together through the at least one first orifice based on the position of the outer check and the inner check.

3. The fuel injector of claim 1, wherein:
the first passage is adapted to allow flow of the first fuel therethrough,
the first passage is adapted to be selectively connected to the at least one first orifice based on the position of the outer check,
the second passage is adapted to allow flow of the second fuel therethrough, and
the second passage is adapted to be selectively connected to the at least one second orifice based on the position of the inner check.

4. The fuel injector of claim 1,
wherein the first fuel is one of natural gas, or alcohol, and
wherein the second fuel is one of diesel or gasoline.

5. The fuel injector of claim 1, wherein:
the at least one first orifice is inclined at a first included angle with respect to a central axis, and
the at least one second orifice is inclined at a second included angle with respect to the central axis, such that the first included angle is equal to the second included angle.

6. The fuel injector of claim 1, wherein:
the at least one first orifice is inclined at a first included angle with respect to a central axis, and
the at least one second orifice is inclined at a second included angle with respect to the central axis, such that the first included angle is different with respect to the second included angle.

7. The fuel injector of claim 1, wherein a cross-sectional area of the at least one first orifice is equal or greater with respect to a cross-sectional area of the at least one second orifice.

8. A fuel injection system comprising:
a first fuel source adapted to provide a first fuel therefrom;
a second fuel source adapted to provide a second fuel therefrom;
a fuel injector provided in fluid communication with each of the first fuel source and the second fuel source, the fuel injector comprising:
a nozzle including at least one first orifice provided therein,
the at least one first orifice adapted to selectively inject the first fuel therethrough;
an outer check disposed movably within the nozzle,
the outer check including at least one second orifice provided therein,
the at least one second orifice being disposed within the nozzle, and
the at least one second orifice adapted to selectively inject the second fuel therethrough; and
an inner check disposed movably and concentrically within the outer check; and
a controller communicably coupled to each of the first fuel source, the second fuel source, and the fuel injector.

9. The fuel injection system of claim 8, wherein the controller is configured to:
provide flow of the first fuel from the first fuel source to the fuel injector;
provide flow of the second fuel from the second fuel source to the fuel injector;
control a position of the outer check;
inject, selectively, the first fuel through the at least one first orifice;
control a position of the inner check;
inject, selectively, the second fuel through the at least one second orifice; and
inject, selectively, at least one of the first fuel and the second fuel through the at least one first orifice.

10. The fuel injection system of claim 9, wherein the controller is further configured to:
control at least one of the position of the inner check or the position of the outer check to align the at least one second orifice with respect to the at least one first orifice to inject the first fuel and the second fuel together through the at least one first orifice.

11. The fuel injection system of claim 8, further comprising:
a first passage provided between the nozzle and the outer check,
the first passage adapted to allow flow of the first fuel therethrough, and the first passage adapted to be selectively connected to the at least one first orifice based on the position of the outer check.

12. The fuel injection system of claim 8, further comprising:
a second passage provided between the outer check and the inner check,
the second passage adapted to allow flow of the second fuel therethrough, and
the second passage adapted to be selectively connected to the at least one second orifice based on the position of the inner check.

13. The fuel injection system of claim 8, wherein the first fuel is one of natural gas, alcohol, diesel, or gasoline.

14. The fuel injection system of claim 8, wherein:
the at least one first orifice is inclined at a first included angle with respect to a central axis, and
the at least one second orifice is inclined at a second included angle with respect to the central axis, such that the first included angle is equal to the second included angle.

15. The fuel injection system of claim 8, wherein:
the at least one first orifice is inclined at a first included angle with respect to a central axis, and
the at least one second orifice is inclined at a second included angle with respect to the central axis, such that the first included angle is different with respect to the second included angle.

16. The fuel injection system of claim 8, wherein a cross-sectional area of the at least one first orifice is equal or greater with respect to a cross-sectional area of the at least one second orifice.

17. A method for controlling a fuel injector, the fuel injector having a nozzle, an outer check, and an inner check, the method comprising:
providing flow of a first fuel to the fuel injector;
providing flow of a second fuel to the fuel injector;
controlling a position of the outer check;
controlling a position of the inner check; and
injecting, selectively, the first fuel and the second fuel together through at least one first orifice of the nozzle after the second fuel is injected through at least one second orifice included in the outer check.

18. The method of claim 17, further comprising:
aligning the at least one second orifice with respect to the at least one first orifice to inject the first fuel and the second fuel together through the at least one first orifice.

19. The method of claim 17, further comprising:
sequentially injecting the first fuel through the at least one first orifice, and the second fuel through each of the at least one first orifice and the at least one second orifice.

20. The method of claim 19, further comprising:
controlling at least one of the position of the outer check or the position of the inner check with respect to the nozzle to limit injection of at least one of the first fuel or the second fuel through the at least one first orifice.

\* \* \* \* \*